INVENTOR
Paul O. Pfeiffer
BY Evans & McCoy
ATTORNEYS

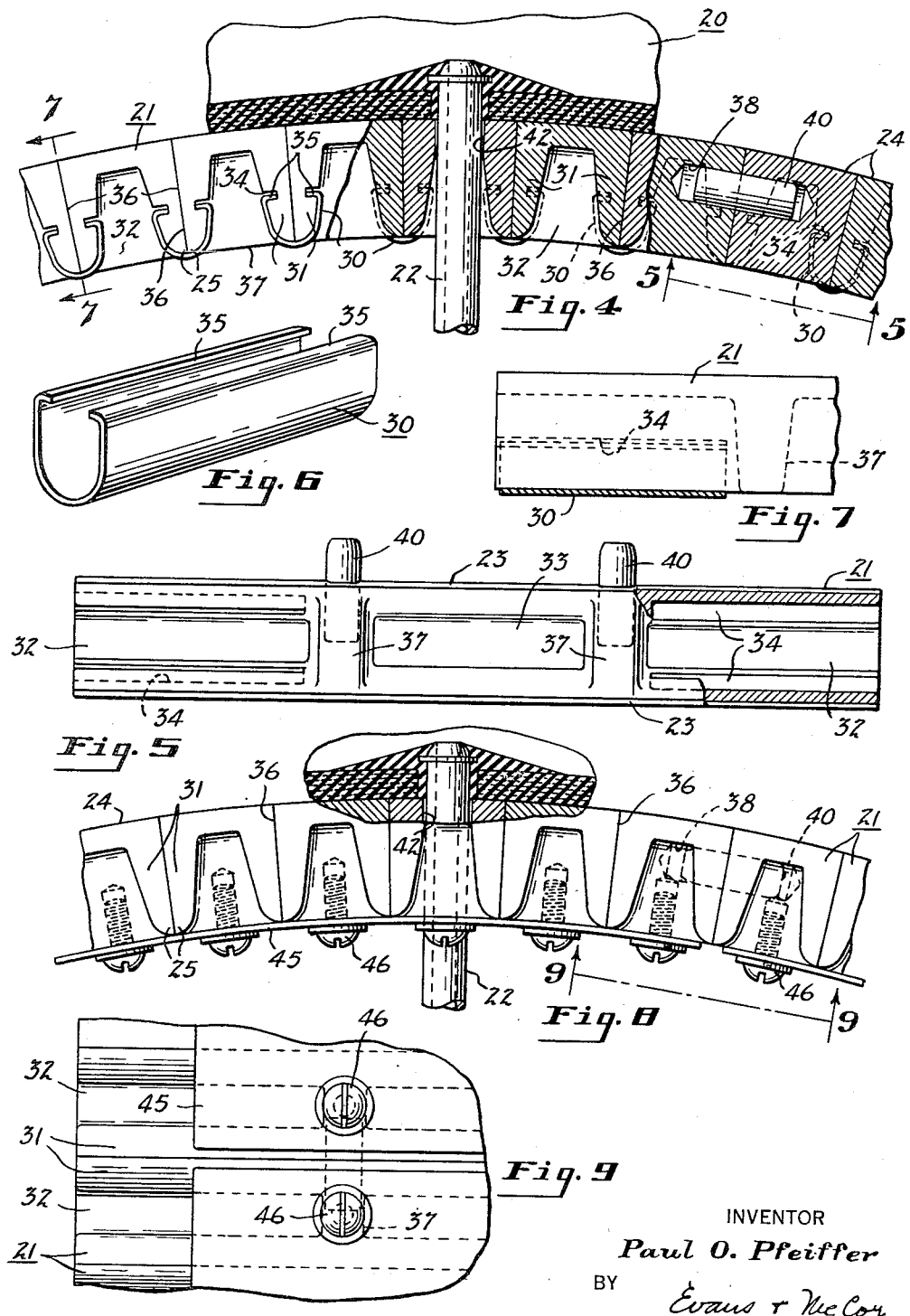

Patented June 1, 1954

2,679,662

UNITED STATES PATENT OFFICE 2,679,662

INFLATION ANNULUS FOR TIRE RETREADING APPARATUS

Paul O. Pfeiffer, Akron, Ohio, assignor to The General Tire and Rubber Company, Akron, Ohio, a corporation of Ohio Application September 11, 1948, Serial No. 48,887

6 Claims. (Cl. 18—38)

1

This invention relates to inflation devices for use in the retreading of pneumatic vehicle tires. More specifically, it relates to a device insertable in a tire casing to press the tread and shoulder portions of the tire outwardly against the matrix or heater of a retreading mold.

In the repairing or renewing of a pneumatic vehicle tire by the application of a layer or strip of new rubber to the crown of the casing and the subsequent curing and vulcanization of the new rubber in a heated mold, it is customary to apply pressure to the inside of the casing to force the tread and shoulder portions, or crown thereof, firmly against the heated curing mold.

In some instances the tire is mounted on a rim and inflated by means of the usual inner tube. This system is not entirely satisfactory because the inflation pressure is limited by the strength of the casing or carcass and because the reinforcing cords of the casing are subjected to severe stresses while being heated during the vulcanization process.

As an alternative arrangement, an inflation device is inserted within the tire casing. Such inflation device applies pressure or bears against only those portions of the carcass or casing that carry the tread and shoulder portions, or crown, of the tire. The device may be of any desired circumferential extent, preferably being completely annular, and comprises a non-yielding support or ring receivable within the tire and an inflatable bag or annulus mounted on such ring for engagement with the inside of the casing. The pressure exerted against the inside of the casing by the inflation device is confined to those areas of the casing that are externally embraced or supported by the curing mold. Thus high pressures may be used in the bag or annulus of the inflation device to provide a good bond between the new rubber and the old rubber of the casing and to completely fill the mold or matrix by proper flowing of the new rubber during vulcanization.

The present invention is concerned with and has for one of its principal objects the provision of an improved inflation device or ring of light weight and simple construction, permitting facile insertion and removal thereof from a tire casing to obtain economies in the operation of a retreading and recapping mold, and permitting the use of high inflation pressures in the annulus or bag so as to obtain better mold filling and bonding characteristics.

It is another object of the invention to provide an inflation device having a ring or support made up of a plurality of elongated block elements, each preferably of keystone section, disposed in side by side relation so as mutually to support one another over an arc or circle and to resist radial displacement toward the center of the arc or circle. The support is preferably completely annular in extent, although the same principles may be applied to a device of less than annular extent.

2

Another object is to provide such a support or ring in which the individual blocks are arranged in side by side relation with their long axes parallel to one another and substantially equidistant from a common center.

Another object is to provide such a support or ring in which adjacent blocks are connected together and restrained against relative displacement by means disposed against the radially inward sides of the blocks. This aspect of the invention contemplates, as a preferential arrangement, the use of resilient spring metal connecting elements which interfit with adjacent blocks and yieldingly resist relative movement of the blocks so connected. As an alternative arrangement a continuous connector, preferably of resilient spring metal, extends across and is secured against the inwardly directed sides of the blocks.

As a further refinement of the invention the blocks of the ring or support are formed with flanges and resilient spring metal connecting elements, preferably of C section, which embrace the flanges of adjacent blocks so as to yieldingly resist circumferential separation of the blocks. The C sectioned connectors are arranged, as by interfitting them with the blocks, to resist relative radial displacement of adjacent blocks.

A still further object is to provide a support or ring of side by side blocks, preferably of keystone section, which are connected together for relative pivotal movement along their inner edge corners to permit collapsing and coiling of the ring or support for insertion into and removal from a tire casing as a unit.

Other objects and advantages relate to certain combinations, details of construction and arrangements of parts which will become apparent from the following detailed description of the invention made in connection with the accompanying drawings forming a part of the specification. Like parts throughout the several views are indicated by the same letters and numerals of reference. In the drawings:

Fig. 4 is a fragmentary elevational detail, partly in section and with parts broken away and removed, showing the keystone blocks and the C connectors of the inflation device;

Fig. 5 is an elevational view, partly in section and with parts removed, showing the radially inwardly directed side of one of the keystone block elements, this view being taken substantially along the line indicated at 5—5 of Fig. 4;

Fig. 6 is a perspective view of one of the resilient spring metal channel clips for connecting adjacent blocks;

Fig. 7 is a sectional detail, with parts broken away and removed, taken substantially on the line indicated at 7—7 of Fig. 4;

Fig. 8 is a fragmentary elevational view of a support or ring of modified form, this view corresponding to Fig. 4; and Fig. 9 is a fragmentary view showing a portion of the radially inwardly directed faces of the ring device of Fig. 8, this view being taken substantially along the line indicated at 9—9 of Fig. 8.

Figure 1:
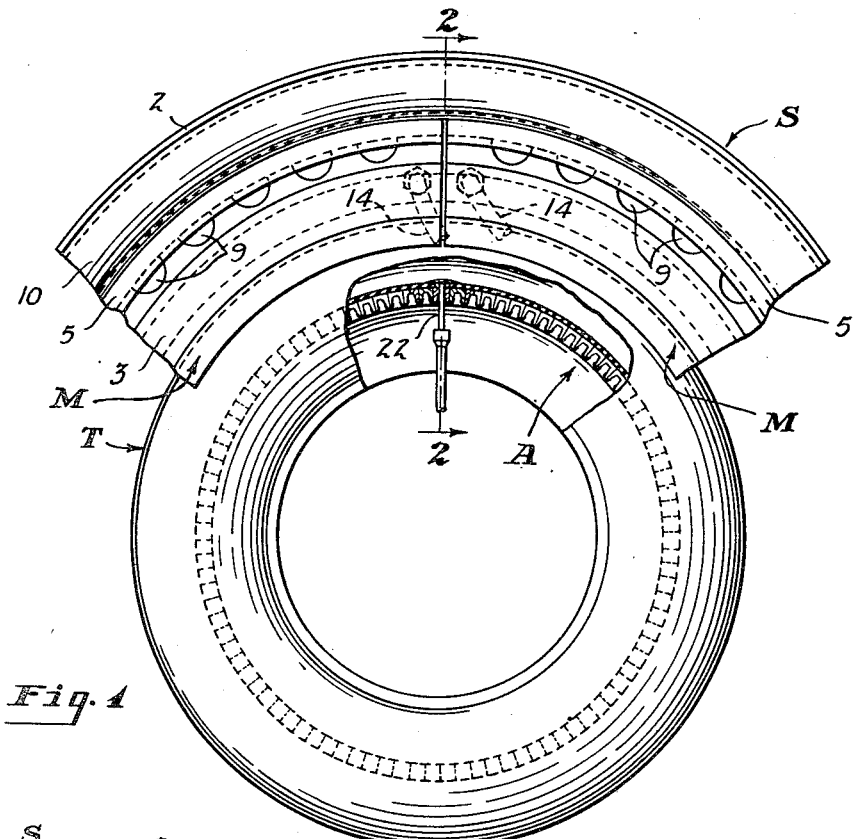
Figure 1 is a fragmentary, partly diagrammatic elevational view, partly in section and with parts broken away and removed, showing the inflation device of the present invention as used in combination with tire retreading apparatus.
Figure 2:
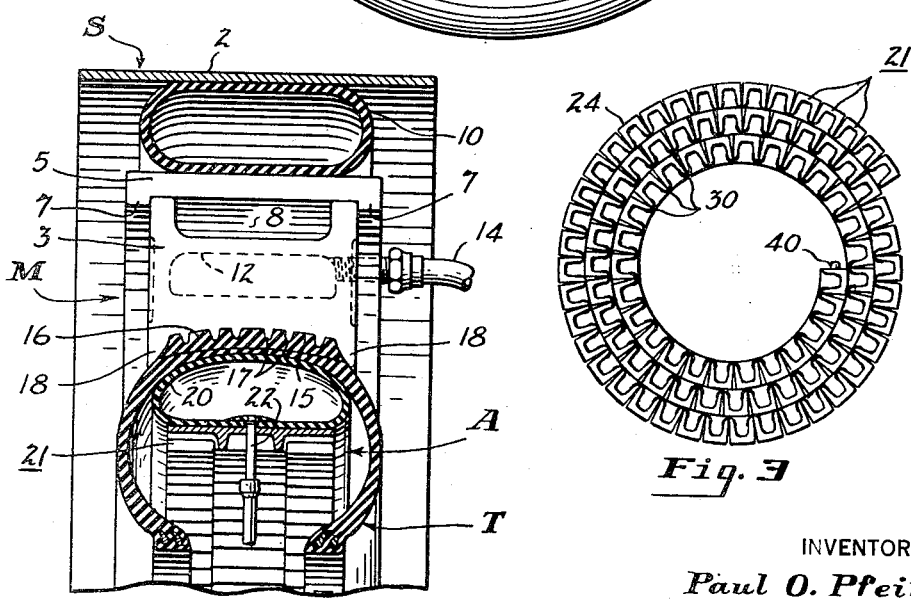
Fig. 2 is a fragmentary sectional detail through the apparatus of Fig. 1 taken substantially on the line 2—2 of Fig. 1 and enlarged with respect to that figure.

The inflation device of the present invention can be used in conventional molds for repairing, retreading and recapping pneumatic tires. A suitable molding apparatus is disclosed in copending application, Serial No. 48,841, filed September 11, 1948, now Patent No. 2,606,342, for United States patent on Vulcanizing Apparatus for Retreading Tires. The vulcanizer referred to is partially illustrated in the present drawings and comprises a plurality of matrix segments M mounted on a supporting structure S for radial movement toward and away from closed or tire clamping positions. The supporting structure S comprises a ring 2, which constitutes the body of the structure, mounted on a pedestal or base, not shown. The ring is in the form of a cylindrical steel ring which embraces all of the matrix segments. The matrix segments cooperatively provide an annular or full circle heating surface for contacting the road engaging portions of a tire T. The tire is supported in the apparatus and circumferentially embraced by the matrices M, only portions of the latter being shown in the drawings. Inside the tire T the inflation device or annulus A, embodying the principles of the present invention, forces the tread and shoulder portions of the tire outwardly against the faces of the matrix segments M during the vulcanizing process.

Each matrix segment is a composite unit including a hollow heater body 3 disposed against the inwardly directed face of one of three arcuate support segments 5. Outwardly directed radial flanges 7 of the heaters are cut away or relieved at spaced intervals to provide openings 9 for the passage of ambient cooling air which circulates through insulating spaces 8 between the heaters and the support segments.

Interposed between the matrix segments M and the inner cylindrical face of the support ring 2 is a fluid operated device or annulus 10 which can be expanded by inflation and actuates the matrix segments M to clamp them about the periphery of the tire T. The matrix segments are mounted for radial movement toward and away from the supporting ring 2 as by springs, links, or toggle joints such as disclosed in the patent application referred to. The inflatable annulus or fluid device 10 is of cord reinforced rubber, made to withstand high fluid pressures of the order of about one hundred to about two hundred pounds per square inch. It is inflated by air or other pneumatic fluid introduced through a conventional valve stem under the control of suitable valves, not shown.

The heaters or mold members 3 are of arcuate form and have inwardly directed concave faces 15 which contact the road engaging tread portions of the tire T. Heat is supplied to the matrix segments as by introducing steam into heater chambers 12 through flexible steam conductors 14. The layer of new rubber, indicated at 16, applied about the roughened periphery of the old tire casing being renewed or repaired is thus heated and molded to the desired shape. Suitable tread forming configurations such as ribs 17 may be cast integrally on the heater faces 15. Along the sides of each of the heaters are a pair of inwardly extending radial ribs 18 having edges which engage the old rubber of the tire circumferentially along the shoulders of the tire carcass. By the use of narrow shoulder contacting ribs, each of which has only a small area of contact against the old rubber of the tire T, burning of the latter is minimized. These spaced parallel shoulder contacting ribs confine the fresh rubber 16 during the vulcanizing process while the rubber is in plastic flowable condition. It is desirable to minimize the heating of the old rubber of the tire so that no burning or overcuring of the old rubber occurs.

Within the tire T is disposed the inflation device A which presses the tread and shoulder portions of the tire outwardly against the matrix segments. This device comprises an inflatable tubular bag or annulus 20 which is mounted on and embraces an annular support or ring formed of a plurality of elements or blocks 21. The annulus 20 is made of cord reinforced rubber sheet material such as that employed in the building of pneumatic vehicle tires. Several layers of the ply material are built up with the parallel cords diagonally arranged and alternately disposed in successive plies. A bag or annulus having four to eight plies, preferably about six plies, has been found to be satisfactory for use in truck and bus tires. In building the annulus, a flat cord ply material strip is formed into a band and its edges folded in and overlapped to form an annular tube. The cords are disposed at an angle of from about 30° to about 60°, preferably about 45° to the edges of the flat ply material strip. Each successive ply is similarly wrapped about the preceding tube assembly and a covering layer of rubber stock is applied about the cord plies. Curing is then done in a heated mold or in open steam.

Each of the block elements 21 is sector shaped in cross section, resembling a keystone, its side faces 23 being disposed in planes which intersect at the center of the ring support. Side faces 23 of each of the blocks are thus disposed in abutting relation against like side faces of adjacent blocks and the abutment planes radiate from the common ring center which is also the center of the inflation device. Each block is of approximately the same radial height or depth as its circumferential extent, and is of elongated character, being several times longer than its height or width. The blocks are arranged with their long axes parallel to one another and substantially equidistant from the center of the ring. Preferably, outer face 24 of each block is cylindrically curved across its width, corresponding to the curvature of a cylinder having its axis at the center of the ring. Thus the outer surfaces 24 of the blocks provide a substantially continuous cylindrical face for supporting the annulus 20.

To prevent relative movement or displacement of adjacent blocks under concentrated loads, or during assembly with or removal from a tire, suitable means is provided on the radially inward directed sides of the ring blocks or segments for connecting the latter together. This connecting means is arranged to resist separation of the inner edge corners 25 of adjacent blocks while permitting the confronting faces 23 to swing toward and away from one another about axes at or adjacent the inner edge corners 25.

A preferred means for connecting the block elements is a series of trough or channel shaped clips 30. Each of these clip elements is formed of resilient spring metal and is received in embracing relation about the edges of abutted pairs of flanges 31 formed on the blocks 21. The clip elements are elongated and of substantially uniform C section. They are arranged in pairs, the long axes of the clips of each pair being aligned and disposed substantially in the plane of abutment, indicated at 36, of the blocks connected by such pair. Preferably, the flanges and the clips are of complementary shape so that the inside surfaces of the clips contact and bear against the blocks. Thus, the spring clips are supported by the blocks against collapse or deformation in resisting distortion of the ring to a greater radius than that for which it is designed. The block flanges may be separately formed to project from the inner faces of the blocks or, as shown, may be provided by recesses 32 which open through the inner faces and ends of the blocks. These end recesses in the blocks are separated from central recesses 33 by integral cross members 37 which connect the sides of the blocks to resist collapse of the block walls under severe circumferential forces. The flanges 31 are disposed in back to back relation, the confronting block side faces 23 being the contacting and mutually supporting faces of the flange means.

Figure 3:
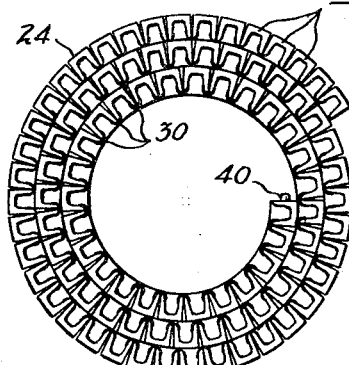
Fig. 3 is a side view of the support or ring showing the same collapsed and coiled or rolled upon itself into a scroll-like roll for insertion or removal through one of the circular bead openings of the tire being retreaded.

The confronting faces of the flanges 31 of each block are undercut as by grooves 34, or otherwise, to provide retaining shoulders engaged by inwardly directed opposed flanges 35 integrally formed along the edges of the spring elements 30 and directed toward one another. The flanges 31 are of such thickness, the undercut grooves 34 are of such depth, and the C-shaped spring clips 30 are of such size and shape that the clips are initially sprung apart or distended in assembly, normally to press the confronting faces 23 of the blocks against one another, thereby urging the support ring to assume its normal circular shape. While the spring clips 30, matching the abutted block flanges in cross section, permit the ring to be collapsed to a lesser radius or rolled upon itself substantially to the shape illustrated in Fig. 3, in which collapsed shape it may be readily inserted into or removed from the tire T, the ring strongly resists deformation in a reverse direction as to a larger radius such as would tend to occur under a heavy inward radial load.

By reason of the interlocking engagement of each sector block 21 and the spring clips 30, the sector blocks are restrained against relative radial shifting and the outer faces 24 of adjacent blocks are thus maintained flush or in alignment with one another.

The spring elements 30 are omitted between at least one pair of the sector blocks 21 as indicated in Fig. 4. The confronting faces 23 of these blocks are formed with aligned recesses 38 to receive pins 40 which prevent relative radial displacement of the blocks. The pins 40 are held in the recesses of one of the blocks by friction or press fits and have sliding fits in the recesses of the other block so that the ends of the rings may be circumferentially separated at the meeting faces of such blocks for collapsing and rolling of the ring during insertion and removal. Other pins similar to the pins 40 may be used at the meeting faces of all of the blocks about the entire periphery of the ring to provide interlocks which resist relative radial displacement of the blocks. As shown in Fig. 5, the recesses 38 for the alignment pins 40 are formed in the reinforcing ribs or members 37 of the blocks. One or more of the block elements 21 is formed with a centrally disposed opening 42 through its outer face 24 to receive the inflation stem 22 of the annulus 20. By removal of one or more of the blocks 21 the annulus support ring can be circumferentially shortened for adjustment to fit inside tires of different sizes.

An alternate connecting means for resisting relative displacement and separation of the blocks 21 is shown in Figs. 8 and 9. In lieu of the spring metal clips 30 a continuous band, belt, or strip 45 is disposed across the radially inwardly directed faces of the blocks 21 and is secured to the blocks by screws 46 threaded into sockets formed in the reinforcing partitions or cross members 37. The band or strip 45 is formed of suitable inextensible material, preferably a resilient metal such as spring steel. The screws 46 are received through closely fitted openings in the band 45 to strongly resist circumferential separation or relative axial and radial movement of the blocks 21. The blocks are thus constrained against all relative movement except pivoting about axes at or adjacent inner edge corners 25. The inextensible band 45 prevents separation of the abutting faces 23 of the blocks under inwardly directed radial loads applied to the outer faces 24 of the blocks, thereby preventing collapse of the support ring under the stresses imposed thereon during the tire vulcanizing process. The band 45 may be of any desired width, preferably being narrower than the long dimension of the blocks, as shown in Fig. 9. In lieu of a single band or strip, several strips or bands may be used, extending around the inside of the ring inwardly of the blocks in side by side relation and individually attached to the blocks. The retaining and locating band or strip is broken in the plane of abutment of the blocks having the alignment pins 40 to permit the ring to be collapsed inwardly and coiled or rolled upon itself into the scroll-like roll illustrated in Fig. 3 for insertion in and removal from a tire. In its coiled scroll-like form comprising a plurality of convolutions closely wound one upon another, the collapsed ring has a relatively small over-all dimension which permits insertion or removal of the scroll through the circular bead openings of the tire.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration, without intending to limit the scope of the claims to the specific details disclosed.

What I claim and desire to secure by Letters Patent of the United States is:

1. In an inflation device for use in tire vulcanizing apparatus, a pressure ring comprising a plurality of elongated blocks disposed in side by side relation to form a ring and having inner and outer sides facing radially inwardly and outwardly, the axial length of each block being several times its dimension circumferentially of the ring, the long axes of the blocks being parallel and substantially equidistant from the center of the ring, resilient spring metal means disposed against said inwardly facing sides of the blocks and extending between and connected to adjacent blocks to hold portions of the blocks adjacent their inwardly facing sides in contact and to yieldingly resist separation of the outer portions of the blocks.

2. A collapsible ring of the type comprising a multiplicity of similar elongated axially extending blocks, each having inwardly converging side faces that abut side faces of adjoining blocks, the blocks being arranged about a common center with their long axes parallel, characterized in that the blocks are formed with recesses opening toward the center and in that the combination includes spring metal elements disposed on the inside of the ring, the elements extending through the planes of the block faces and being elongated in such planes, and each element being interfitted with a plurality of the blocks so that the spring metal elements connect the blocks, the spring elements having portions extending into the block recesses.

3. A collapsible ring of the type comprising a multiplicity of similar elongated axially extending blocks, each having inwardly converging side faces that abut side faces of adjoining blocks, the blocks being arranged about a common center with their long axes parallel, characterized in that the blocks are formed with recesses opening toward the center and in that the combination includes spring metal elements disposed on the inside of the ring, the elements extending through the planes of the block faces and being elongated in such planes, and each element being interfitted with a plurality of the blocks so that the spring metal elements connect the blocks, the spring elements being of C shape and disposed in straddling relation to portions of the blocks adjacent said abutting faces, portions of the elements extending into the block recesses.

4. A collapsible ring of the type comprising a multiplicity of similar elongated axially extending blocks, each having inwardly converging side faces that abut side faces of adjoining blocks, the blocks being arranged about a common center with their long axes parallel, characterized in that the blocks are formed with recesses opening toward the center and in that the combination includes spring metal elements disposed on the inside of the ring, the elements extending through the planes of the block faces and being elongated in such planes, and each element being interfitted with a plurality of the blocks so that the spring metal elements connect the blocks, the spring elements being of C shape with inturned ends, the inturned ends of each element being directed toward one another and socketed in the walls of the block recesses.

5. An inflation annulus for use in pneumatic tire repairing comprising in combination an annular inflatable flexible member and a collapsible ring for supporting the flexible member, said ring comprising a multiplicity of elongated recessed blocks disposed in side by side relation with their long axes substantially parallel to one another and substantially normal to the plane of the ring, each block having side faces that taper toward the center of the ring and that abut the side faces of adjoining blocks, the diameter of the ring being several times the length of the blocks, the recess in each block being of greater radial depth than circumferential length, the blocks having faces directed toward the center of the ring with the block recesses opening through such faces, and connecting means disposed against the inwardly directed faces of the blocks and attached to the blocks for resisting separation of the blocks from one another and for constraining the recessed blocks to relative hinging movements about substantially parallel axes which substantially parallel the said long axes of the blocks, the connecting means permitting constrained collapsing of the ring and rolling of the ring upon itself into a scroll-like roll having a relatively small over-all dimension and a plurality of convolutions closely wound one upon another.

6. In tire tread vulcanizing apparatus that includes an inflatable annulus that is positioned within the peripheral portion of a pneumatic tire casing radially outwardly of the bead opening of the casing for pressing the tread to be vulcanized against the interior of a mold that encircles said tread, the combination therewith of a supporting ring for said annulus that is composed of a series of axially elongated blocks each having a radially outer face that conforms substantially to a short segment of a surface of revolution and side faces of substantial radial depth throughout their length that taper toward the ring axis and that contact with corresponding faces of adjoining blocks to resist the radial inward pressure exerted by said annulus when inflated whereby said blocks are pressed together and held in a rigid ring by said inflation pressure, and means connecting said blocks for hinging movement about parallel axes that are adjacent the inner margins of each pair of contacting faces except one, the said one pair of contacting faces being relatively movable when said pressure is released whereby said ring may be collapsed when said annulus is deflated and rolled upon itself into a plurality of contacting convolutions to reduce its external diameter and facilitate its passage through a bead opening of the tire casing.

References Cited in the file of this patent

UNITED STATES PATENTS

| Number | Name | Date |
|---|---|---|
| 59,578 | Follensbee | Nov. 13, 1866 |
| 386,377 | Bright | July 17, 1888 |
| 605,750 | Schou | June 14, 1898 |
| 745,585 | Ferguson | Dec. 1, 1903 |
| 958,628 | Gorman | May 17, 1910 |
| 972,875 | Kurze | Oct. 18, 1910 |
| 1,135,858 | Smith | Apr. 13, 1915 |
| 1,466,366 | Lehmann | Aug. 28, 1923 |
| 1,599,771 | Klaus | Sept. 14, 1926 |
| 1,603,017 | Biggert, Jr., et al. | Oct. 12, 1926 |
| 2,088,130 | Broering et al. | July 27, 1937 |
| 2,152,765 | Kite et al. | Apr. 4, 1939 |
| 2,259,975 | Hewel | Oct. 21, 1941 |
| 2,372,246 | Bacon, Jr. | Mar. 27, 1945 |
| 2,398,151 | Napier | Apr. 9, 1946 |

FOREIGN PATENTS

| Number | Country | Date |
|---|---|---|
| 15,855 | Great Britain | Sept. 6, 1900 |
| 385,495 | France | July 21, 1908 |